(12) United States Patent
Hirano et al.

(10) Patent No.: US 8,050,719 B2
(45) Date of Patent: *Nov. 1, 2011

(54) RADIO COMMUNICATION SYSTEM, MOBILE TERMINAL UNIT THEREOF, AND AZIMUTH DETERMINING METHOD

(75) Inventors: Jun Hirano, Kanagawa (JP); Takashi Aramaki, Yokohama (JP); Gen-Ichirou Ohta, Miura (JP)

(73) Assignee: Panasonic Corporation, Osaka (JP)

( * ) Notice: Subject to any disclaimer, the term of this patent is extended or adjusted under 35 U.S.C. 154(b) by 296 days.

This patent is subject to a terminal disclaimer.

(21) Appl. No.: 12/269,645

(22) Filed: Nov. 12, 2008

(65) Prior Publication Data

US 2009/0131112 A1 May 21, 2009

Related U.S. Application Data

(62) Division of application No. 11/256,059, filed on Oct. 24, 2005, now Pat. No. 7,630,738, which is a division of application No. 10/807,386, filed on Mar. 24, 2004, now Pat. No. 6,996,420, which is a division of application No. 10/239,925, filed as application No. PCT/JP02/00725 on Jan. 30, 2002, now Pat. No. 6,731,955.

(30) Foreign Application Priority Data

Jan. 31, 2001 (JP) .................................. 2001-24523

(51) Int. Cl.
*H04M 1/00* (2006.01)
(52) U.S. Cl. ................. 455/562.1; 455/575.7; 455/63.4; 455/69; 455/25; 455/107; 370/335; 342/444; 342/357.03; 342/405; 342/442

(58) Field of Classification Search ............... 455/562.1, 455/69, 107, 25, 575.7, 63.4; 370/335; 342/444, 342/357.03, 405, 442; 701/213
See application file for complete search history.

(56) References Cited

U.S. PATENT DOCUMENTS 4,595,924 A 6/1986 Gehman
(Continued)

FOREIGN PATENT DOCUMENTS

JP 5344037 12/1993
(Continued)

OTHER PUBLICATIONS

International Search Report dated Apr. 9, 2002.

*Primary Examiner* — Marceau Milord
(74) *Attorney, Agent, or Firm* — Dickinson Wright PLLC

(57) ABSTRACT

Disclosed are a mobile station unit which can obtain azimuth information with a simple construction and a radio communication system including the mobile terminal unit. According to the present invention, in a terminal station, an arrival direction obtaining section 203 obtains an arrival direction of a received azimuth designation signal from a reference station or another terminal station using an arithmetic operation or the like. A transmitting direction forming section 204 determines the direction opposite to the arrival direction obtained by the arrival direction obtaining section 203 as a transmitting direction. A reference azimuth detecting section 207 detects the transmitting direction determined by the transmitting direction forming section 204 as a reference azimuth. An azimuth designation signal generating section 205 generates an azimuth designation signal so as to radiate radio waves having directivity in the transmitting direction determined by the transmitting direction forming section 204.

8 Claims, 12 Drawing Sheets

U.S. PATENT DOCUMENTS

| | | | |
|---|---|---|---|
| 5,257,031 A * | 10/1993 | Scarpetta et al. | 342/374 |
| 5,345,388 A | 9/1994 | Kashiwazaki | |
| 5,471,218 A | 11/1995 | Talbot et al. | |
| 5,671,160 A | 9/1997 | Julian | |
| 5,754,950 A * | 5/1998 | Petersson et al. | 455/273 |
| 5,771,978 A | 6/1998 | Davidson | |
| 5,821,900 A | 10/1998 | Kishimoto | |
| 5,845,206 A | 12/1998 | Castiel | |
| 5,898,402 A | 4/1999 | Kilpatrick | |
| 5,924,034 A | 7/1999 | Dupuy | |
| 5,973,638 A | 10/1999 | Robbins et al. | |
| 6,088,593 A | 7/2000 | Dent | |
| 6,157,343 A | 12/2000 | Andersson et al. | |
| 6,195,042 B1 | 2/2001 | Durnez et al. | |
| 6,266,528 B1 * | 7/2001 | Farzaneh | 455/423 |
| 6,304,210 B1 | 10/2001 | Allison et al. | |
| 6,352,222 B1 * | 3/2002 | Maeda et al. | 244/158.8 |
| 6,369,755 B1 * | 4/2002 | Nichols et al. | 342/357.52 |
| 6,377,812 B1 * | 4/2002 | Rashid-Farrokhi et al. | 455/522 |
| 6,477,183 B1 | 11/2002 | Yamamoto | |
| 6,522,898 B1 * | 2/2003 | Kohno et al. | 455/562.1 |
| 6,606,057 B2 * | 8/2003 | Chiang et al. | 342/374 |
| 6,700,538 B1 * | 3/2004 | Richards | 342/458 |
| 6,701,133 B1 * | 3/2004 | Bennett et al. | 455/71 |
| 6,731,955 B2 * | 5/2004 | Hirano et al. | 455/562.1 |
| 6,764,049 B1 | 7/2004 | Maeda | |
| 6,888,806 B1 | 5/2005 | Miller | |
| 6,996,420 B2 * | 2/2006 | Hirano et al. | 455/562.1 |
| 7,630,738 B2 * | 12/2009 | Hirano et al. | 455/562.1 |

FOREIGN PATENT DOCUMENTS

| | | |
|---|---|---|
| JP | 88814 | 1/1996 |

* cited by examiner

| TERMINAL STATION | TRANSMISSION OF AZIMUTH DESIGNATION SIGNAL | NON-TRANSMISSION OF AZIMUTH DESIGNATION SIGNAL |
|---|---|---|
| 1404-1 | ✓ | ☐ |
| 1404-2 | ☐ | ✓ |
| ⋮ | ⋮ | ⋮ |
| 1404-N | ✓ | ☐ |

FIG.16

| | USE | NOT USE |
|---|---|---|
| INCREASING AZIMUTH ACCURACY (+10) | ✓ | ☐ |
| PROVIDING AZIMUTH INFORMATION (-5) | ✓ | ☐ |
| PROVIDING ELECTRIC POWER (-10) | ☐ | ✓ |
| SUPPLYING ELECTRIC POWER (+20) | ✓ | ☐ |

+: CHARGING
−: PAYBACK

| TOTAL | +25 |
|---|---|

RADIO COMMUNICATION SYSTEM, MOBILE TERMINAL UNIT THEREOF, AND AZIMUTH DETERMINING METHOD

This application is a divisional application of application Ser. No. 11/256,059 filed Oct. 24, 2005 now U.S. Pat. No. 7,630,738, which is a divisional of application Ser. No. 10/807,386 filed Mar. 24, 2004 (U.S. Pat. No. 6,996,420), which is a divisional of application Ser. No. 10/239,925 filed Sep. 27, 2002 (U.S. Pat. No. 6,731,955), which is a national stage of PCT/JP02/00725 filed Jan. 30, 2002 and which claims priority of Japanese application number 2001-24523 filed Jan. 31, 2001.

TECHNICAL FIELD

The present invention relates to a radio communication system for specifying a predetermined reference azimuth and then obtaining azimuth information on the basis of the specified reference azimuth, and more particularly to a ratio communication system suitably used for an ad hoc network.

RELATED ART

In a radio communication system including a plurality of mobile units, azimuth information to specify a moving direction or a transmitting direction of radio waves is provided to the mobile units which freely move in a service area. The azimuth information can be used to select a path to a target place together with positional information. The azimuth information is used so that various systems may coexist. In other words, since the transmitting direction of radio waves is controlled on the basis of the azimuth information, interference with other systems can be reduced, so that a plurality of systems can coexist easily.

As a technique for providing the foregoing azimuth information, GPS (Global Positioning System) has been known. In the GSP, each mobile station receives a signal from a satellite using a GPS receiver to measure its own position or time. The mobile station can obtain azimuth information from the result of measurement.

The mobile station can obtain azimuth information using a gyro. On the other hand, a fixed station can obtain azimuth information so long as a direction is set when the fixed station is installed.

In a conventional method for obtaining azimuth information as mentioned above, the mobile station needs to have the GPS receiver or the gyro. Accordingly, there are disadvantages in that the size of a unit is large and a manufacturing cost also increases.

SUMMARY OF THE INVENTION

The present invention is made in consideration of the above actual situation. It is an object of the present invention to provide a mobile terminal unit serving as a mobile station unit which can obtain azimuth information with a simple constitution, a radio communication system having the mobile station unit, and an azimuth determining method.

According to the present invention, there is provided a radio communication system comprising a reference station which transmits an azimuth designation signal having directivity toward a previously set reference azimuth, and a plurality of terminal stations, wherein a target terminal station, included in the plurality of terminal stations, comprises receiving means which receives the azimuth designation signal transmitted from the reference station, arrival direction obtaining means which obtains an arrival direction of the received signal, azimuth designation signal generating means which generates an azimuth designation signal having directivity in the direction opposite to the arrival direction of the azimuth designation signal, and transmitting means which transmits the azimuth designation signal generated by the azimuth designation signal generating means.

According to this construction, since the reference station included in the radio communication system transmits the azimuth designation signal toward the reference azimuth, the arrival direction of the azimuth designation signal transmitted toward the reference azimuth is obtained to specify the reference azimuth, so that azimuth information can be obtained. Consequently, the radio communication system can be constructed without providing a GPS receiver or the like for the terminal station.

According to the present invention, in the radio communication system, the receiving means is constructed so as to receive the azimuth designation signals transmitted from the reference station and another terminal station.

According to this construction, the reference station and the terminal stations transmit the azimuth designation signals, thereby constructing an independently distributed system. As mentioned above, since the terminal station transmits the azimuth designation signal, the terminal station can specify the reference azimuth accurately.

According to the present invention, in the radio communication system, the target terminal station comprises reference azimuth specifying means which detects a direction of the directivity of the azimuth designation signal generated by the azimuth designation signal generating means as a reference azimuth.

According to this construction, the reference station and the terminal stations, included in the radio communication system, transmit the azimuth designation signals toward the reference azimuth. Accordingly, the arrival directions of the azimuth designation signals transmitted toward the reference azimuth are obtained to specify the reference azimuth, so that azimuth information can be obtained. Consequently, the azimuth information can be obtained without providing a GPS receiver or the like. The construction of a unit serving as the terminal station can be miniaturized and a manufacturing cost of the unit can be reduced.

According to the present invention, in the radio communication system, the reference azimuth is set in the longitudinal direction of a service area of the radio communication system.

According to the present invention, in the radio communication system, the reference station is installed along a road and the reference azimuth is set in a direction along the road.

According to the constructions, the reference azimuth is appropriately set in accordance with the form of the service area. Accordingly, the number of azimuth designation signals to be received by the terminal station included in the system can be larger than that of a case where the reference azimuth is set in another direction. Therefore, the reference azimuth can be detected accurately.

According to the present invention, the radio communication system further comprises means which detects a reference plane to be referred when a communicating direction is determined.

According to this construction, a transmitting direction of the azimuth designation signal can be determined in consideration of a transmitting direction on the reference plane. Consequently, correct azimuth information can be obtained.

According to the present invention, in the radio communication system, each of the reference station and the plurality of terminal stations adds priority information to the azimuth designation signal and then transmits the resultant signal, and the azimuth designation signal generating means weights the plurality of received azimuth designation signals in accordance with the priority information to generate the azimuth designation signal.

According to this construction, the arrival directions are weighted in accordance with the priorities of the azimuth designation signals to determine the arrival direction of the azimuth designation signal, so that the arrival direction can be determined accurately. Consequently, since the reference azimuth can be detected accurately, the accuracy of the obtained azimuth designation also increases.

According to the present invention, the radio communication system further comprises priority adding means which adds priority to the azimuth designation signal, the priority decreasing each time transmission is performed.

According to the construction, since the priority is decreased each time the azimuth designation signal is transmitted, a deviation in the transmitting direction from the reference azimuth can be reduced, the deviation being caused by repeating the transmission of the azimuth designation signal.

According to the present invention, in the radio communication system, the target terminal station comprises averaging means which averages the arrival directions obtained by the arrival direction obtaining means, and the azimuth designation signal generating means generates an azimuth designation signal having directivity in the direction opposite to the averaged arrival direction.

According to the construction, since the transmitting direction is determined on the basis of the average of the arrival directions, the arrival direction can be obtained accurately. Therefore, the terminal station can accurately detect azimuth information and can also correctly transmit radio waves carrying the azimuth designation signal toward the reference azimuth. Consequently, the accuracy at which the azimuth is detected increases in the whole system.

According to the present invention, in the radio communication system, the terminal station comprises means which extracts an electric power from the azimuth designation signal.

According to the construction, the electric power can be transmitted to the terminal station using the azimuth designation signal.

According to the present invention, in the radio communication system, the terminal station comprises means which extracts an electric power from the azimuth designation signal. According to the present invention, in the radio communication system, the terminal station comprises means which superimposes an electric power on the azimuth designation signal.

According to the constructions, the electric power can be transmitted to the terminal station using the azimuth designation signal. Consequently, continuous available time derived by charging once extends, so that the system becomes more convenient to the user.

According to the present invention, the radio communication system comprises a charging management unit comprising a management table which holds communicating situations of the plurality of terminal stations, and a charge determining section which determines a charge for each terminal station with reference to the management table in accordance with the communicating situation of the corresponding terminal station.

According to the construction, since the charge can be determined in accordance with the communication situation of each terminal station, the system can be operated efficiently. For example, the terminal station which transmits the azimuth designation signal is released from a charge. Releasing from the charge as mentioned above results in an incentive to transmit the azimuth designation signal for the terminal station. Consequently, since many transmission sources of the azimuth designation signals can be held in the system, azimuth information can be obtained using the azimuth designation signal in a wide range of the service area of the system.

According to the present invention, there is provided an azimuth determining method for determining an azimuth in a terminal station, comprising the steps of: in a reference station, transmitting an azimuth designation signal so as to form directivity toward a previously set reference azimuth; and in the terminal station, receiving the azimuth designation signal in the terminal station, obtaining an arrival direction of the azimuth designation signal, generating an azimuth designation signal having directivity in the direction opposite to the obtained arrival direction, transmitting the generated azimuth designation signal, specifying a reference azimuth on the basis of the arrival directions of the azimuth designation signals transmitted from the reference station and the terminal station, and determining an azimuth on the basis of the specified reference azimuth.

According to the method, since the reference station and the terminal station, included in the radio communication system, transmit the azimuth designation signals toward the reference azimuth, the arrival directions of the azimuth designation signals transmitted toward the reference azimuth are obtained to specify the reference azimuth, so that azimuth information can be obtained. Consequently, since the azimuth information can be obtained without providing a GPS receiver or the like, the construction of a unit serving as the terminal station can be miniaturized and a manufacturing cost of the unit can be reduced.

According to the present invention, there is provided a mobile terminal unit comprising: receiving means which receives an azimuth designation signal, which is transmitted from a reference station so as to form directivity in a previously set reference azimuth; arrival direction obtaining means which obtains an arrival direction of the received signal; azimuth designation signal generating means which generates an azimuth designation signal having directivity in the direction opposite to the arrival direction of the azimuth designation signal; reference azimuth specifying means which detects the direction of the directivity of the azimuth designation signal generated by the azimuth designation signal generating means as a reference azimuth; and transmitting means which transmits the azimuth designation signal generated by the azimuth designation signal generating means.

The receiving means receives an azimuth designation signal transmitted from another mobile communication terminal unit, and the arrival direction obtaining means obtains an arrival direction of the azimuth designation signal transmitted from the other mobile terminal unit.

According to the construction, the arrival direction of the azimuth designation signal transmitted toward the reference azimuth is obtained to specify the reference azimuth, so that azimuth information can be obtained. Consequently, since the azimuth information can be obtained without providing a GPS receiver or the like, the construction of the unit can be miniaturized and a manufacturing cost of the unit can be reduced.

BRIEF DESCRIPTION OF THE DRAWINGS

FIG. 16 is a diagram showing an example of the constitution of the management table;

BEST MODE FOR CARRYING OUT THE INVENTION

According to the main point of the present invention, a terminal station in a system receives radio waves radiated from a reference station or another terminal station in an azimuth previously set by the system and then obtains azimuth information. The terminal station radiates radio waves in the direction opposite to an arrival direction of the received waves and then obtains an azimuth in the system to determine the azimuths of the respective terminals.

Embodiments of the present invention will now be described in detail with reference to the accompanying drawings.

First Embodiment

According to the present embodiment, a radio communication system comprises a plurality of reference stations each of which radiates radio waves in a reference azimuth previously set by the system, and terminal stations each of which receives the radio waves from the reference station or another terminal station and then radiates radio waves in the direction opposite to the receiving direction. The reference station and the terminal station will now be described hereinbelow.

Figure 1A:
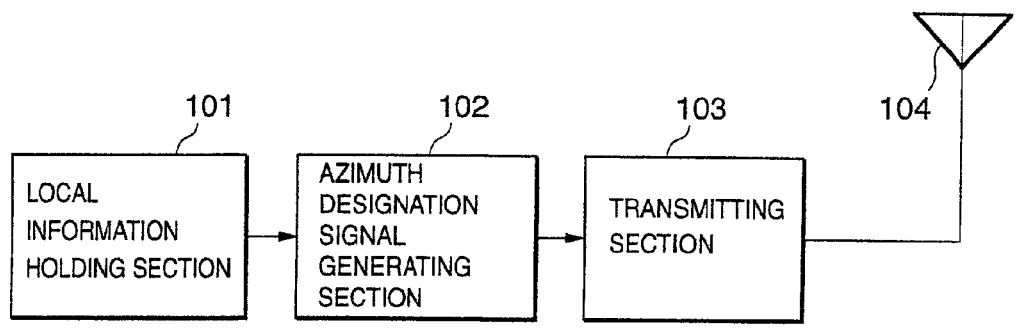
FIG. 1A is a block diagram showing a constitution of a reference station according to a first embodiment of the present invention.
Figure 1B:
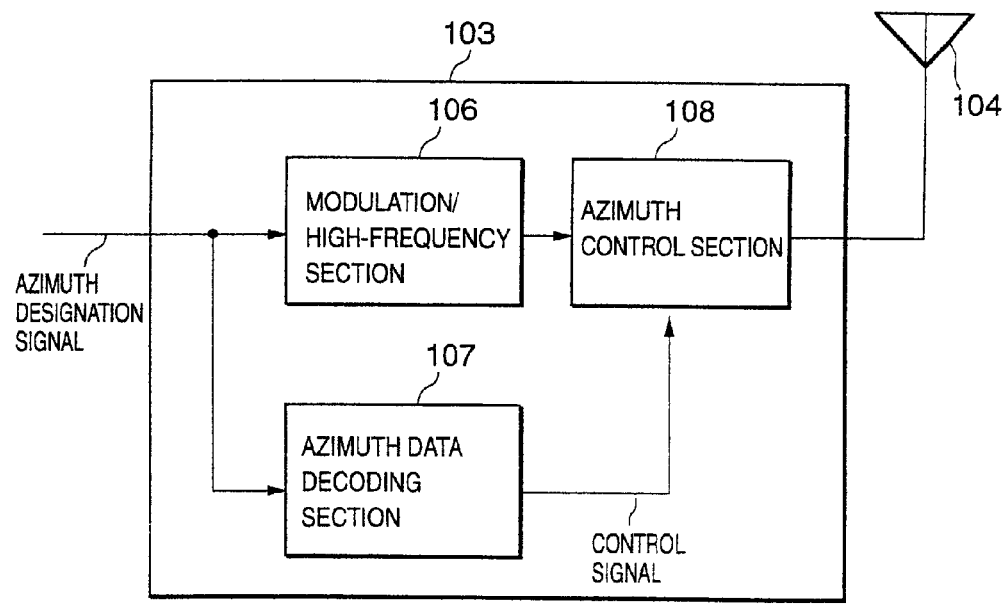
FIG. 1B is a block diagram showing an example of a constitution of a transmitting section in FIGS. 1 and 2.

First, the reference station will be described with reference to FIGS. 1A and 1B. FIG. 1A is a block diagram showing a constitution of the reference station according to the first embodiment of the present invention. FIG. 1B is a block diagram showing an example of a constitution of a transmitting section in FIG. 1A. Generally, the reference station is installed fixedly. A local information holding section 101 holds positional information regarding a position at which the corresponding reference station is installed, information regarding a horizontal plane, and information regarding the reference azimuth previously set by the system according to the present embodiment.

An azimuth designation signal generating section 102 forms directivity of a transmission signal toward the reference azimuth with reference to the information held by the local information holding section 101. The directivity is formed using, for example, an adaptive array antenna (hereinbelow, referred to as an "AAA"). In other words, the azimuth designation signal generating section 102 multiplies the transmission signal by a weight calculated using a fit algorithm such as LMS algorithm or RLS algorithm, thereby generating an azimuth designation signal to radiate radio waves having the directivity in the reference azimuth. A transmitting section 103 has a modulation/high-frequency section 106, an azimuth data decoding section 107, and an azimuth control section 108 as shown in FIG. 1B. The azimuth control section 108 is incorporated with a directivity-controllable antenna section 104 in order to radiate radio waves having the directivity in a designated direction. In other words, the azimuth data decoding section 107 decodes codes indicative of the designated azimuth included in the azimuth designation signal to generate a control signal to control the azimuth control section 108 so as to radiate the radio waves in the decoded azimuth. The modulation/high-frequency section 106 frequency-converts the azimuth designation signal generated by the azimuth designation signal generating section 102 into a radio frequency band and then supplies the converted signal to the antenna section 104 through the azimuth control section 108. The emitted azimuth designation signal is a signal indicating that the signal should be emitted in a predetermined azimuth. For example, in order to discriminate the azimuth designation signal from a data signal, the signal may have a predetermined code or can be set to a predetermined frequency.

Figure 2:
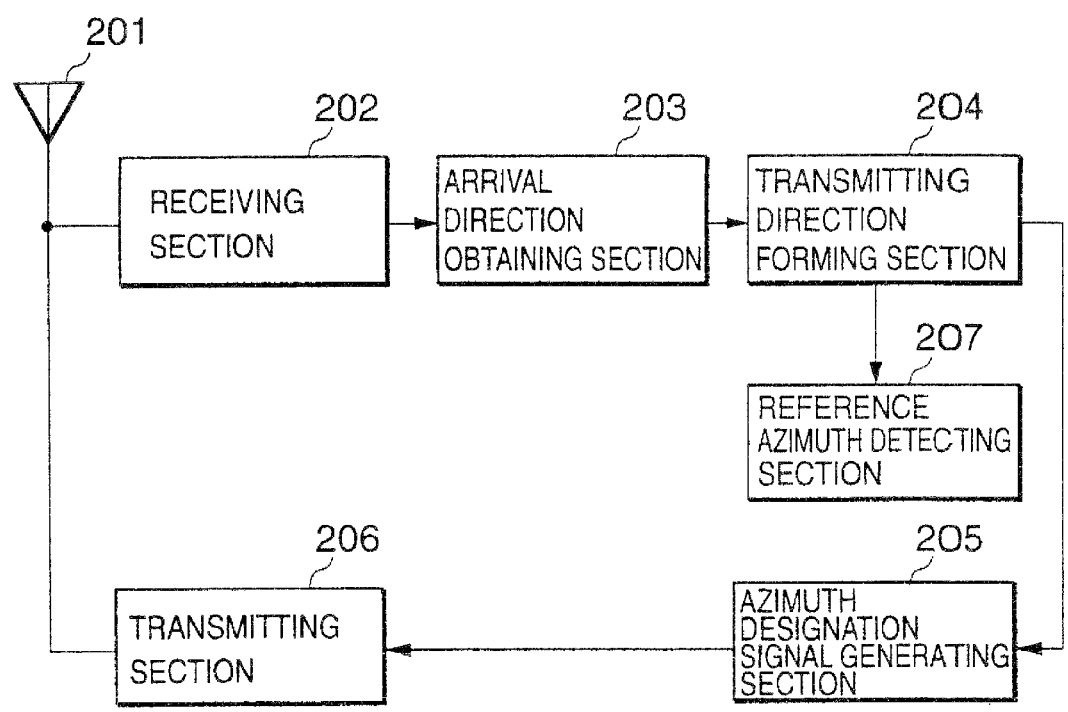
FIG. 2 is a block diagram showing a constitution of a terminal station according to the first embodiment of the present invention.

Subsequently, the terminal station will now be described with reference to FIG. 2. FIG. 2 is a block diagram showing a constitution of the terminal station according to the first embodiment of the present invention. The terminal station receives the azimuth designation signals transmitted from the reference stations or other terminal stations. A receiving section 202 frequency-converts the azimuth designation signal received from an antenna 201 and then outputs the frequency-converted signal to an arrival direction obtaining section 203. The arrival direction obtaining section 203 obtains the arrival direction of the azimuth designation signal.

A transmitting direction forming section 204 determines the direction opposite to the arrival direction obtained by the arrival direction obtaining section 203, namely, the direction obtained by rotating the obtained arrival direction by 180□ as a transmitting direction. A reference azimuth detecting section 207 detects the transmitting direction determined by the transmitting direction forming section 204 as the reference azimuth. An azimuth designation signal generating section 205 multiplies a transmission signal by a weight calculated using the fit algorithm such as LMS algorithm or RLS algorithm to generate an azimuth designation signal to radiate radio waves having the directivity in the transmitting direction determined by the transmitting direction forming section 204. A transmitting section 206 has a constitution similar to that of the foregoing transmitting section 103 shown in FIG. 1B. The transmitting section 206 frequency-converts the azimuth designation signal into a radio frequency band, amplifies an electric power of the converted signal to a predetermined transmission electric power so as to have directivity in the designated direction, and then transmits the resultant signal from the antenna 201.

Figure 3:
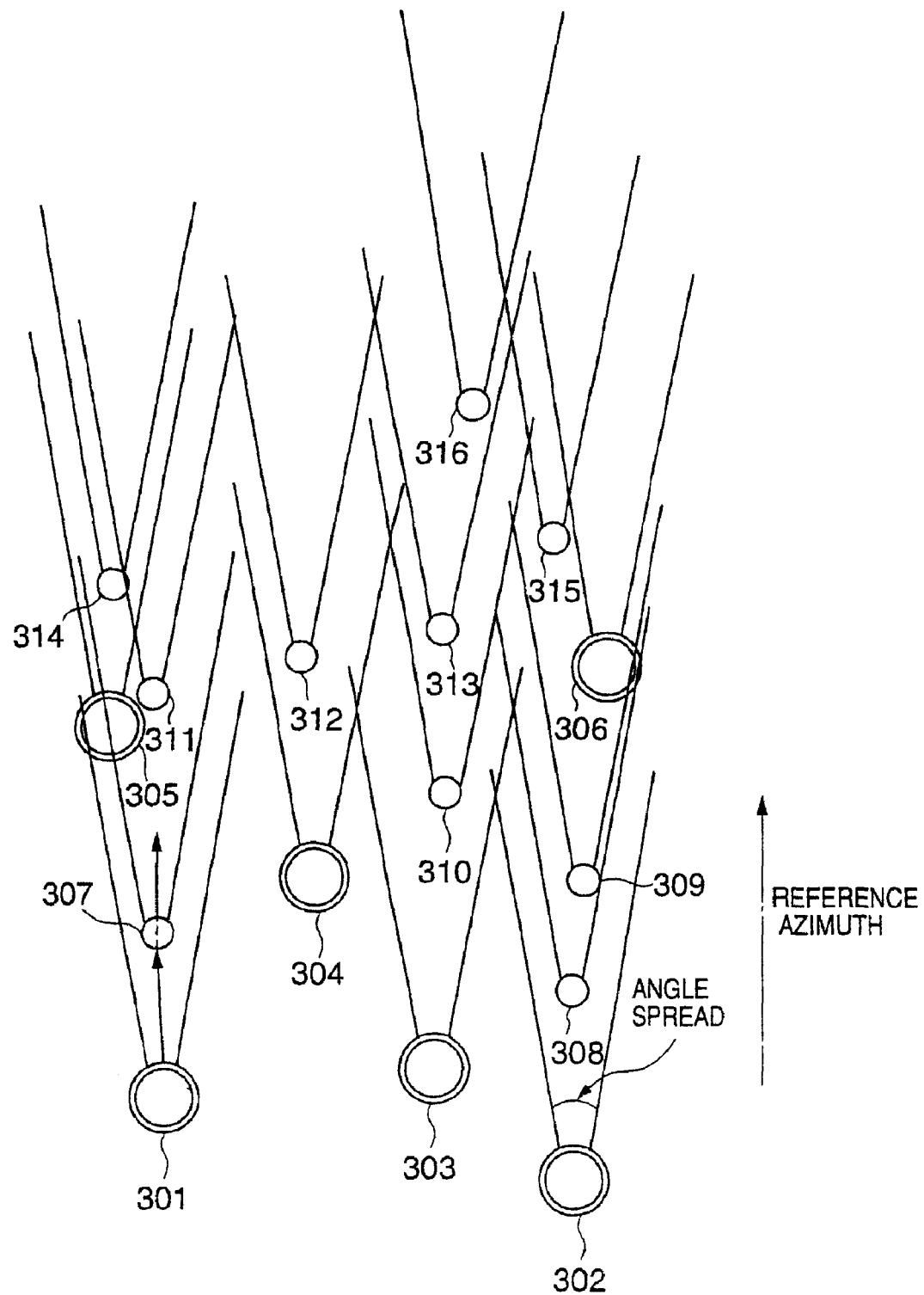
FIG. 3 is a diagram schematically showing a radio communication system according to the first embodiment of the present invention.

In this instance, the radio communication system according to the first embodiment of the present invention will now be described with reference to FIG. 3. FIG. 3 is a diagram schematically showing the radio communication system according to the first embodiment of the present invention.

The reference stations each shown in FIG. 1 are arranged intentionally so as to be distributed in a service area as a coverage of the radio communication system according to the first embodiment of the present invention. FIG. 3 shows reference stations 301 to 306 among the reference stations arranged in the service area of the system. Each of the reference stations 301 to 306 forms directivity in the reference azimuth and transmits an azimuth designation signal. In the present description, the azimuth designation signal transmitted by the reference station may be called a "reference station signal". Actually, each of the reference stations 301 to 306 has a directive lobe in a range of angle spread, where the reference azimuth is set at the center, because of the limit of an accuracy of an AAA technology. In FIG. 3, a direction from bottom to top in the diagram is set to the reference azimuth. The reference azimuth is previously set by the system. Any azimuth can be set to the reference azimuth. In order to simplify the description, the present embodiment will be explained with respect to a case where the reference azimuth is set to "the north". All of the reference stations and the terminal stations included in the system have known the azimuth set as the reference azimuth.

The terminal station shown in FIG. 2 is a mobile terminal unit which freely moves in the service area of the system or a fixed terminal unit installed fixedly in the service area. In FIG. 3, each of terminal stations 307 to 316 obtains the arrival direction of the azimuth designation signal transmitted from the reference station (or another terminal station), forms directivity in the direction opposite to the arrival direction, and then transmits an azimuth designation signal. In the present description, the azimuth designation signal transmitted by the terminal station may be called a "terminal station signal". Since the azimuth designation signal is transmitted toward the reference azimuth, the terminal stations 307 to 316 transmit the azimuth designation signals toward the reference azimuth within a range of errors in the accuracy of acquisition of the arrival direction and the accuracy of the directivity formed in the transmitting direction. When the antenna 104 is an adaptive antenna array, the arrival direction of the foregoing azimuth designation signal can be obtained by an arithmetic operation to combine vectors indicating electric powers received by elements.

As a result, all of the reference stations 301 to 306 and all of the terminal stations 307 to 316 included in the radio communication system according to the present embodiment transmit the azimuth designation signals toward the reference azimuth. Namely, the azimuth designation signals are transmitted toward the reference azimuth from all of points in the coverage of the radio communication system according to the present embodiment. In other words, in the radio communication system according to the present embodiment, the stations (namely, the reference stations and the terminal stations) included in the system transmit the azimuth designation signals toward the reference azimuth, thereby forming a uniform field (hereinbelow, referred to as a "directive field") to specify the transmitting direction of the azimuth designation signal in the system. In the directive field, the terminal stations 307 to 316 can recognize the reference azimuth in a manner similar to a case where a compass needle points to an azimuth due to a magnetic field of the earth.

In this instance, when it is assumed that the terminal station 307 is a mobile terminal unit and the terminal station 308 is a fixed terminal unit, procedures of obtaining azimuth information in these terminal stations will now be described. First, the procedure in the mobile terminal unit 307 will be described.

When moving in the service area of the radio communication system according to the present embodiment, the mobile terminal unit 307 receives an azimuth designation signal and obtains an arrival direction of the received azimuth designation signal. The mobile terminal unit 307 detects the direction opposite to the obtained arrival direction, namely, the direction obtained by rotating the arrival direction by 180□ as a reference azimuth. The mobile terminal unit 307 always obtains azimuth information as mentioned above. Accordingly, even if the mobile terminal unit 307 changes its own orientation, the unit 307 can obtain azimuth information.

The procedure of obtaining the azimuth information will now be described specifically with reference to FIG. 12. First, in the mobile terminal unit 307, the reference azimuth detecting section 207 specifies the reference azimuth (in this case, "the north") on the basis of the azimuth designation signal as mentioned above. In a state in which the reference azimuth is specified, namely, in a state in which the reference azimuth is specified on the basis of the result of obtaining of the arrival direction of the azimuth designation signal, when a signal (hereinbelow, referred to as a "data signal") other than the azimuth designation signal is received, the arrival direction obtaining section 203 obtains an arrival direction of the received data signal. A difference between the arrival direction of the data signal and the arrival direction of the azimuth designation signal is detected, so that an "azimuth" in which the received signal has come can be specified. Information indicative of the "azimuth" specified in this manner is called "azimuth information".

Figure 12:
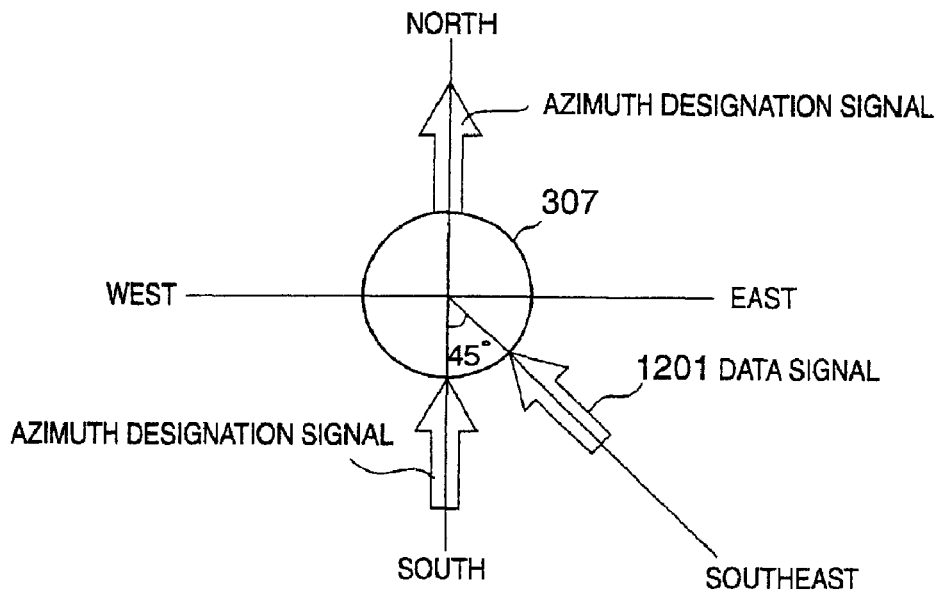
FIG. 12 is a diagram explaining an azimuth information obtaining procedure.

For example, in FIG. 12, as an arrival direction of a data signal 1201, a value deviated from the arrival direction obtaining result of the azimuth designation signal by 45□ toward "the east" is obtained. Consequently, the mobile terminal unit 307 can specify an azimuth, in which the data signal has come, to "the southeast" that is deviated from "the south" by 45□ toward the east on the basis of the arrival direction (in this case, "the south") of the known azimuth designation signal.

On the other hand, the fixed terminal unit 308 receives an azimuth designation signal and then obtains an arrival direction of the received azimuth designation signal. The fixed terminal unit 308 can detect the direction opposite to the obtained arrival direction, namely, the direction obtained by rotating the arrival direction by 180□ as a reference azimuth. Ordinarily, the orientation of the fixed terminal unit 308 does not change from that in the installation state. Accordingly, the fixed terminal unit 308 can perform various processings using azimuth information obtained as mentioned above.

Figure 4:
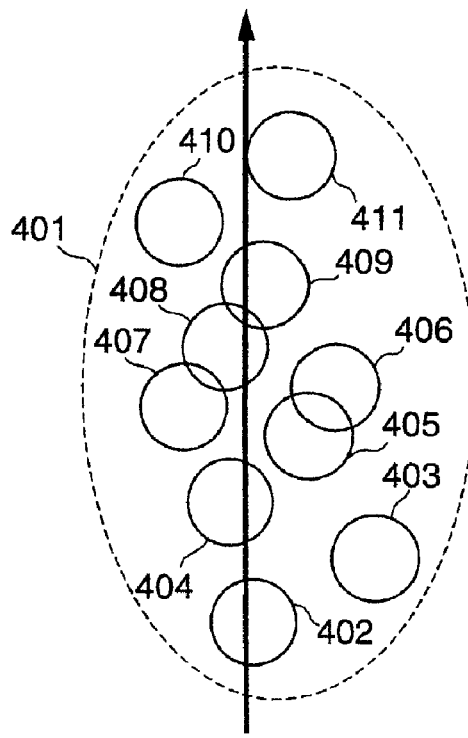
FIG. 4 is a diagram showing an outline of the radio communication system according to the first embodiment of the present invention.

The direction in which the reference azimuth is set will now be described with reference to FIG. 4. FIG. 4 is a diagram showing an outline of the radio communication system according to the first embodiment of the present invention. In FIG. 4, reference stations 402 to 411 are arranged in an elliptic service area 401. In such a radio communication system, preferably, the reference azimuth is set in a direction in which the terminal stations included in the system can receive azimuth designation signals as much as possible, namely, the longitudinal direction of the service area. Since the service area 401 is an ellipse, the reference azimuth is set in the longitudinal direction of the ellipse. Consequently, the number of azimuth designation signals to be received by the terminal stations included in the system can be larger than that in the case where the reference azimuth is set in another direction.

As mentioned above, it is preferable that the reference azimuth be set in the longitudinal direction in the service area, which the radio communication system according to the present embodiment can provide. In situations where the service area covers the whole country of Japan, in consideration of such a fact that the country of Japan extends from the south-southwest to the north-northeast, it is preferable that the reference azimuth be set to the north-northeast or the south-southeast.

Figure 17:
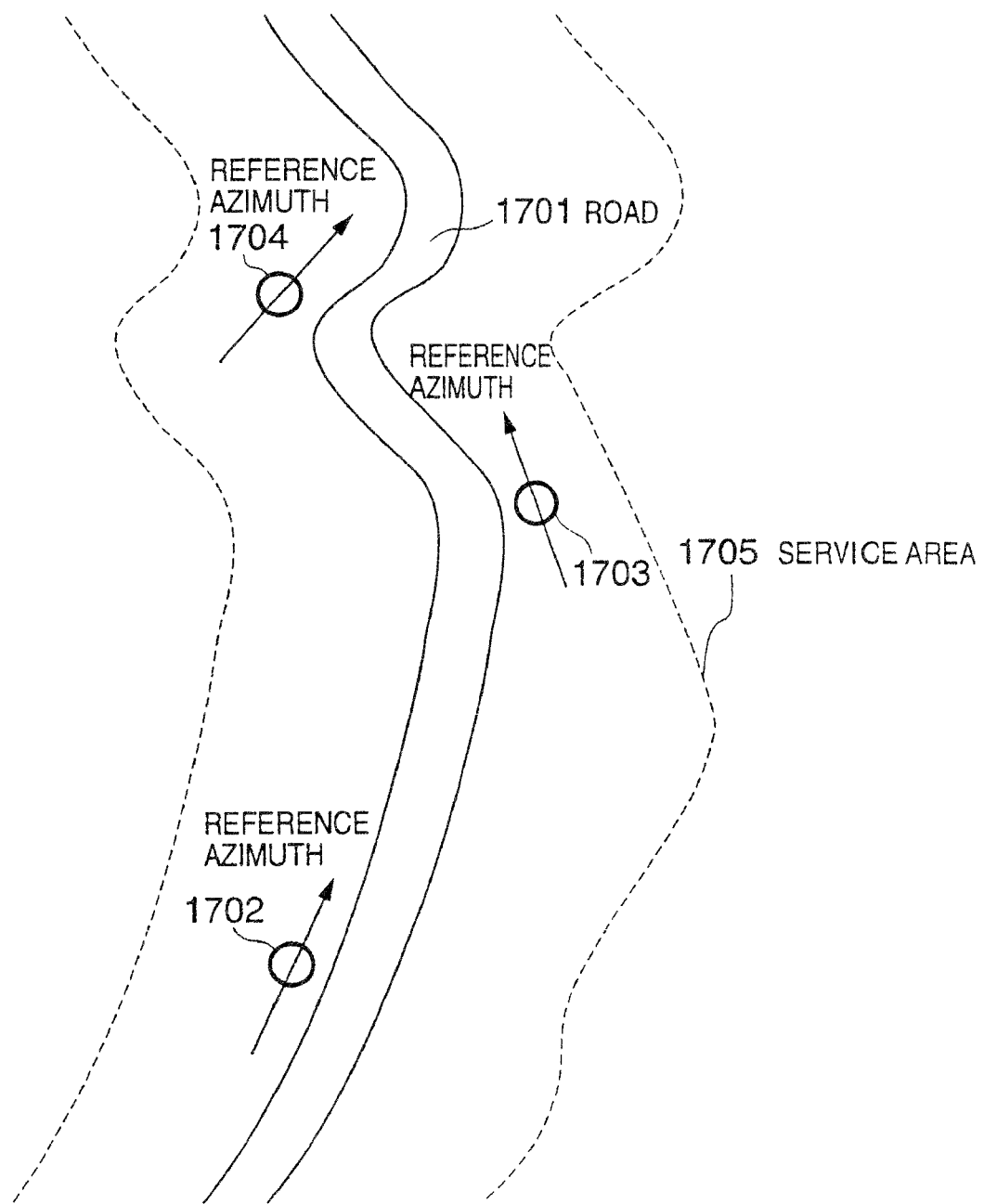
FIG. 17 is a diagram showing an example of setting of a reference azimuth.

When the service area is formed along a road, it is preferable that the reference azimuth be set in a direction along the road. The reference azimuth set in the case where the service area is formed along the road will be explained with reference to FIG. 17. As shown in FIG. 17, in situations where a service area 1705 is formed along a road 1701, the reference azimuth is set along the road. Consequently, the reference azimuth is set along the service area.

In order to set the reference azimuth along the road, reference stations are arranged along the road and each arranged reference station sets a direction (namely, the reference azimuth) of transmission of the azimuth designation signal along the road. The transmitting direction of the azimuth designation signal in the reference station is set when the reference station is installed. Referring to FIG. 17, reference stations 1702 to 1704 are placed along the road at predetermined intervals. Each reference station sets the reference azimuth in a direction along the road. For example, the reference station 1702 sets the reference azimuth in the direction along the road, namely, the direction from the lower left to the upper right of the diagram.

As mentioned above, in the radio communication system according to the present embodiment, each of the reference stations 301 to 306 included in the system transmits the azimuth designation signal toward the reference azimuth, and each of the terminal stations 307 to 316 included in the system obtains the arrival direction of the azimuth designation signal and then transmits the azimuth designation signal in the direction opposite to the obtained arrival direction. In this case, since the azimuth designation signal transmitted from the reference station is transmitted toward the reference azimuth, the terminal station receives the azimuth designation signal in the direction opposite to the reference azimuth and then transmits the azimuth designation signal in the direction opposite to the receiving direction, namely, the direction that is the same as the reference azimuth. In this manner, the reference stations and the terminal stations included in the radio communication system according to the present embodiment transmit the azimuth designation signals toward the reference azimuth. Accordingly, each of the terminal stations 307 to 316 (and the reference stations 301 to 306, if necessary) obtains the arrival direction of the azimuth designation signal, transmitted toward the reference azimuth, to specify the reference azimuth. Consequently, each station can obtain azimuth information. In other words, in the radio communication system according to the present embodiment, each terminal station transmits the azimuth designation signal toward the reference azimuth, thereby independently and distributedly constructing a system to obtain the azimuth information.

As mentioned above, since the terminal stations 307 to 316 according to the present embodiment can obtain azimuth information without any GPS receiver or any gyro, the constitution of the unit can be miniaturized and a manufacturing cost of the unit can be reduced.

The reference stations 301 to 306 are intentionally arranged in the coverage of the radio communication system according to the present embodiment. Accordingly, the terminal station 307 serving as a mobile terminal unit receives the azimuth designation signal pointing toward the reference azimuth in the whole coverage and then obtains azimuth information. Thus, the terminal station 307 can communicate on the basis of the obtained azimuth information. The radio communication system can meet a demand for mobile communication to realize communications "anywhere anytime".

Second Embodiment

Figure 5:
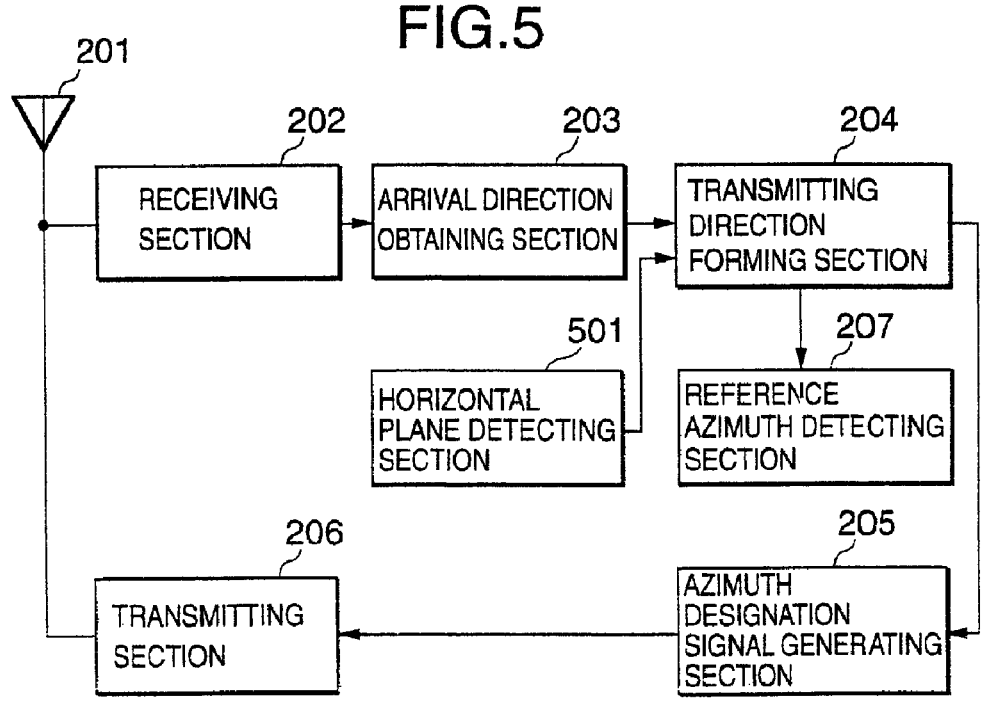
FIG. 5 is a block diagram showing a constitution of a terminal station according to a second embodiment of the present invention.

According to the present embodiment, a transmitting direction of an azimuth designation signal is controlled three-dimensionally. Specifically, a predetermined reference plane is detected three-dimensionally. The transmitting direction of the azimuth designation signal is controlled with reference to the detected reference plane. In a radio communication system according to the present embodiment, the constitution of the terminal station in the first embodiment is partially modified. FIG. 5 is a block diagram showing a constitution of a terminal station according to the second embodiment of the present invention. In FIG. 5, the same reference numerals designate the same components as those in FIG. 2 according to the first embodiment and the description is omitted.

A horizontal plane detecting section 501 detects a horizontal plane. The transmitting direction forming section 204 determines a transmitting direction in a vertical plane in consideration of the horizontal plane detected by the horizontal plane detecting section 501. For example, when an azimuth designation signal comes in a direction of an elevation angle of 30□ with respect to the horizontal plane, the transmitting direction is also set to the elevation angle of 30□. The horizontal plane detecting section 501 can also detect the horizontal plane on the basis of information held by the local information holding section 101 provided for the reference station shown in FIG. 1. In this case, the horizontal plane detecting section 501 obtains information regarding a horizontal plane from the reference station to detect the horizontal plane.

Figure 6:
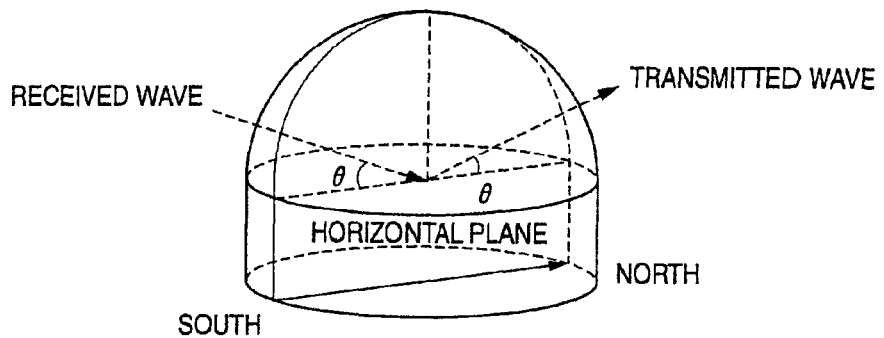
FIG. 6 is a diagram explaining a transmitting direction of transmission waves in the second embodiment of the present invention.

The transmitting direction determined by the transmitting direction forming section 204 will now be described with reference to FIG. 6. FIG. 6 is a diagram explaining the transmitting direction of the azimuth designation signal in the second embodiment of the present invention. FIG. 6 illustrates a case where waves (an azimuth designation signal) to be transmitted are transmitted toward "the north" on the basis of the received waves (an azimuth designation signal) which have come from "the south". The transmitting direction forming section 204 sets the transmitting direction in the horizontal plane on the basis of the arrival direction of the received waves in a manner similar to the first embodiment, and also sets the transmitting direction in the vertical plane on the basis of a planar direction on the horizontal plane detected by the horizontal plane detecting section 501. For instance, the transmitting direction is determined so that the elevation angle on the horizontal plane of the received waves is equivalent to the elevation angle on the horizontal plane of the transmitted waves. Specifically, when the elevation angle of the received waves indicates 30☐, the transmitting direction on the horizontal plane is set in the direction opposite to the arrival direction on the horizontal plane of the received waves by 180☐ and the transmitting direction on the vertical plane is set in a direction in which the elevation angle is 30☐. The transmitting direction forming section 204 may determine a direction parallel to the detected horizontal plane as the transmitting direction on the vertical plane.

As mentioned above, according to the present embodiment, the horizontal plane detecting section 501 detects the horizontal plane, so that the transmitting direction of the azimuth designation signal can be determined in consideration of the vertical direction. Consequently, the azimuth can be detected more accurately.

Third Embodiment

Figure 7:
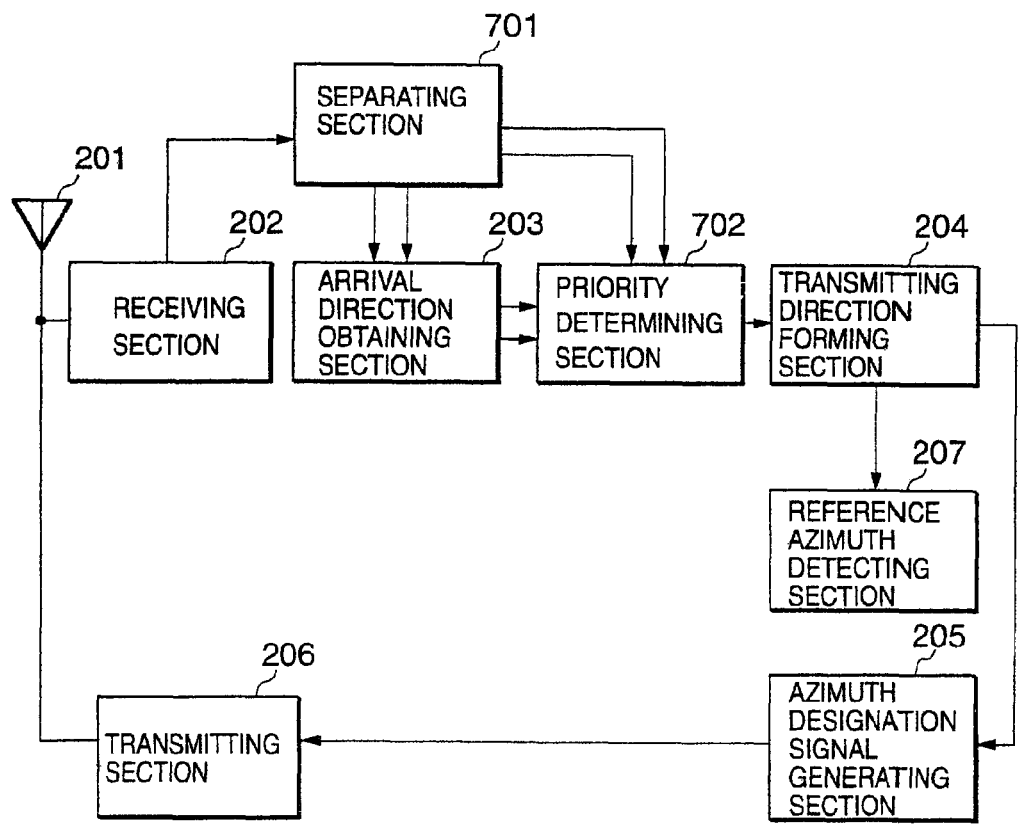
FIG. 7 is a block diagram showing a constitution of a terminal station according to a third embodiment of the present invention.

According to the present embodiment, the operation of a terminal station which receives a plurality of azimuth designation signals will now be described. In a radio communication system according to the present embodiment, the constitution of the terminal station according to the first embodiment is partially modified. FIG. 7 is a block diagram showing a constitution of the terminal station according to the third embodiment of the present invention. In addition to the components of the terminal station shown in FIG. 2, the terminal station shown in FIG. 7 has a separating section 701 for separating a received signal into an azimuth designation signal and priority information and a priority determining section 702 for weighting in consideration of the priority information to determine a transmitting direction of the azimuth designation signal. In FIG. 7, the same components as those in FIG. 2 are designated by the same reference numerals as those in FIG. 2 and the description is omitted.

Each of reference stations and the terminal stations according to the present embodiment adds the priority information to the azimuth designation signal and then transmits the resultant signal. Specifically, each reference station adds a known bit indicating that the azimuth designation signal is transmitted from the reference station to the corresponding signal and then transmits the resultant signal. Each terminal station adds another kind of known bit indicating that the azimuth designation signal is transmitted from the terminal station to the corresponding signal and then transmits the resultant signal.

The antenna 201 receives the azimuth designation signals with the priority information transmitted from the reference station and the terminal station as mentioned above. The receiving section 202 frequency-converts the received signals and then outputs the converted signals to the separating section 701. The separating section 701 separates each received signal into the azimuth designation signal and the priority information serving as the known bit. Then, the separating section 701 outputs two kinds of separated azimuth designation signals to the arrival direction obtaining section 203 and outputs two kinds of separated priority information to the priority determining section 702. The arrival direction obtaining section 203 calculates the arrival directions of a plurality of azimuth designation signals, namely, the azimuth designation signal from the reference station and the azimuth designation signal from the terminal station, and then inputs the result of calculation to the priority determining section 702.

The priority determining section 702 determines priority for each received azimuth designation signal with reference to the priority information and then weights the arrival direction obtained by the arrival direction obtaining section 203 from each azimuth designation signal considering the determined priority. When the azimuth designation signals are transmitted from the reference station and the terminal station, the priority of the azimuth designation signal transmitted from the reference station is higher than that of the azimuth designation signal transmitted from the terminal station. The transmitting direction forming section 204 forms the transmitting direction of the azimuth designation signal on the basis of the arrival direction weighted according to the priority by the priority determining section 702. As mentioned above, the priority determining section 702 weights the arrival direction according to the priority information to determine the transmitting direction of the azimuth designation signal.

Figure 9:
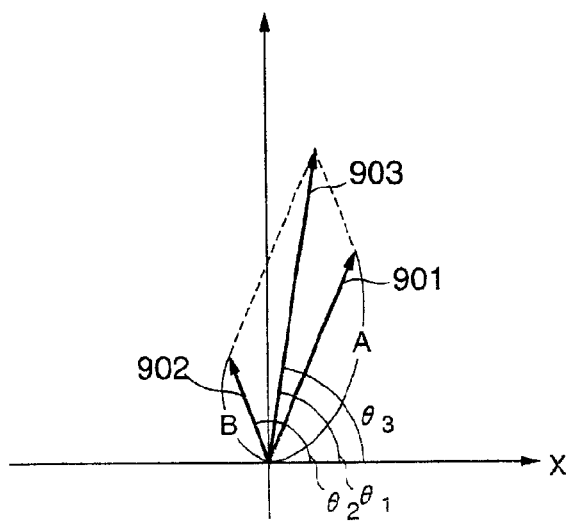
FIG. 9 is a diagram explaining an arrival direction determined in consideration of priority.

In this instance, an example of a procedure of determining the arrival direction in the priority determining section 702 will now be described with reference to FIG. 9. FIG. 9 is a diagram explaining the arrival direction determined in consideration of the priority. In this instance, a case where the terminal station receives two kinds of azimuth designation signals, namely, the azimuth designation signal transmitted from the reference station and the azimuth designation signal from another terminal station will now be explained as an example.

In FIG. 9, a reference station signal vector 901 is a vector indicative of the azimuth designation signal transmitted from the reference station. In the reference station signal vector 901, its magnitude expresses priority A obtained on the basis of the priority information transmitted from the reference station and an angle with respect to the x axis expresses an arrival direction θ1 of the azimuth designation signal transmitted from the reference station, the arrival direction being obtained by the arrival direction obtaining section 203. A terminal station signal vector 902 is a vector indicative of the azimuth designation signal transmitted from the terminal station. In the terminal station signal vector 902, its magnitude expresses priority B obtained on the basis of the priority information transmitted from the terminal station and an angle with respect to the x axis expresses an arrival direction θ2 of the azimuth designation signal transmitted from the terminal station, the arrival direction being obtained by the arrival direction obtaining section 203. The priority determining section 702 determines the priority so that the priority of the azimuth designation signal transmitted from the reference station is higher than that of the azimuth designation signal transmitted from the terminal station. Thus, A>B.

The priority determining section 702 adds information, which indicates a magnitude obtained on referring to the priority information outputted from the separating section 701, to arrival directional information, which is outputted from the arrival direction obtaining section 203 and which indicates an angle, thereby expressing each received azimuth designation signal as a vector. In consideration of such a fact that the accuracy of the arrival direction obtained on the basis of the azimuth designation signal transmitted from the reference station is higher than that of the arrival direction obtained on the basis of the azimuth designation signal from the terminal station, the priority determining section 702 sets the reference station signal vector 901 to be larger than the terminal station signal vector 902.

The priority determining section 702 combines the reference station signal vector 901 and the terminal station signal vector 902 formed as mentioned above to form a combined vector 903. The transmitting direction forming section 204 recognizes an angle □3 defined between the combined vector 903 and the x axis as an arrival direction and then forms an azimuth designation signal having directivity in the direction opposite to the arrival direction.

As mentioned above, according to the present embodiment, the priority determining section 702 sets the priority (namely, "A") of the arrival directional information formed on the basis of the azimuth designation signal, which is accurately transmitted from the reference station toward the reference azimuth, to be higher than the priority (namely, "B") of the arrival directional information formed on the basis of the azimuth designation signal transmitted from the terminal station among the plurality of received azimuth designation signals, thereby weighting the arrival direction of the azimuth designation signal having high accuracy from the reference station. Thus, the priority determining section 702 can determine the transmitting direction of the azimuth designation signal. In this manner, the arrival direction is weighted depending on a transmission source of the azimuth designation signal to determine the arrival direction of the azimuth designation signal, so that the arrival direction can be determined with high accuracy.

Fourth Embodiment

Figure 8:
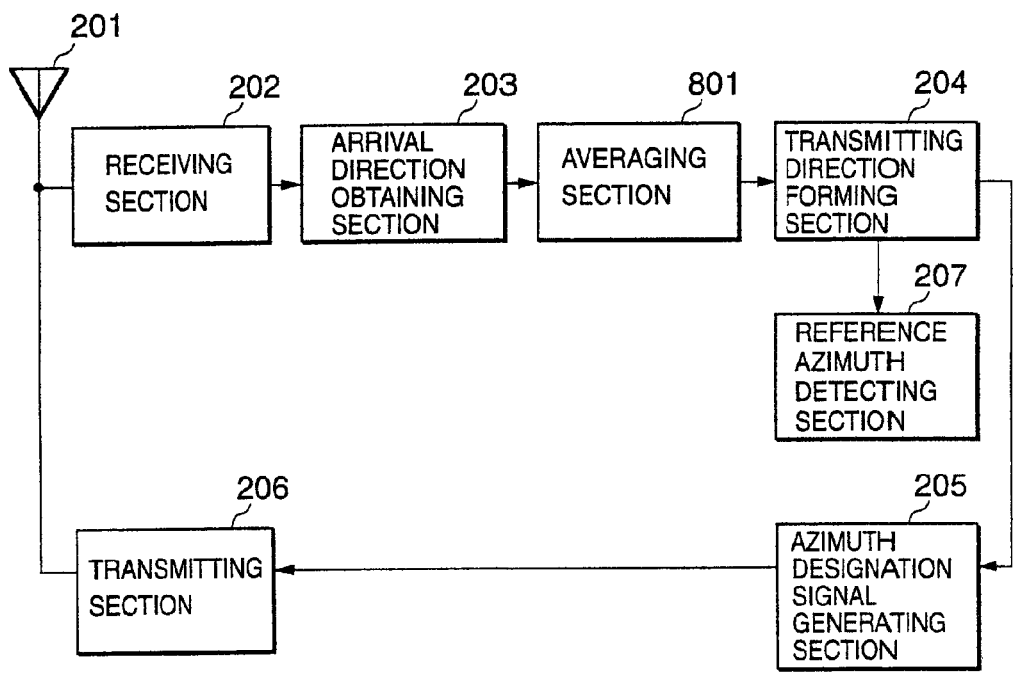
FIG. 8 is a block diagram showing a constitution of a terminal station according to a fourth embodiment of the present invention.

According to the present embodiment, a method for determining an arrival direction of an azimuth designation signal when a plurality of azimuth designation signals are received will be further described. In a radio communication system according to the present embodiment, the constitution of the terminal station according to the first embodiment is partially modified. FIG. 8 is a block diagram showing a constitution of a terminal station according to the fourth embodiment of the present invention. In addition to the components of the terminal station shown in FIG. 2, the terminal station shown in FIG. 8 comprises an averaging section 801 for averaging the arrival directions of received waves obtained by the arrival direction obtaining section 203. In FIG. 8, the same components as those in FIG. 2 are designated by the same reference numerals as those in FIG. 2 and the description is omitted.

For a plurality of azimuth designation signals transmitted from the antenna 201 and received by the receiving section 202, the arrival direction obtaining section 203 obtains the arrival directions of the respective signals. The averaging section 801 averages the arrival directions of the azimuth designation signals obtained by the arrival direction obtaining section 203 to obtain the average of the arrival directions. The transmitting direction forming section 204 determines a direction obtained by rotating a direction represented by the average of the arrival directions by 180□ as a transmitting direction.

As mentioned above, according to the present embodiment, since the arrival direction is obtained on the basis of the average of the arrival directions calculated by the averaging section 801, the transmitting direction can be determined accurately. Therefore, the terminal station can accurately detect an azimuth and also correctly transmit the azimuth designation signal toward the reference azimuth. Accordingly, the accuracy to detect the azimuth can be increased in the whole system.

Fifth Embodiment

According to the reference azimuth detecting method described in the above-mentioned embodiments, it is considered that operation errors in obtaining the arrival directions may be accumulated each time transmission is repeated and the transmitting direction of the azimuth designation signal may be deviated from the reference azimuth because of the accumulation of the errors. According to the present embodiment, priority is set to an azimuth designation signal in accordance with the number of transmission times and the azimuth designation signal having a small number of transmission times is effectively used to obtain the arrival direction.

With respect to a case where priority is set in accordance with the number of transmission times and an azimuth designation signal is then transmitted, two examples will now be described. According to a first example, a transmission electric power is reduced as much as a predetermined amount each time transmission is performed. According to a second example, the priority indicated by the priority information described in the third embodiment is decreased each time transmission is performed. The first example will now be described.

Figure 10:
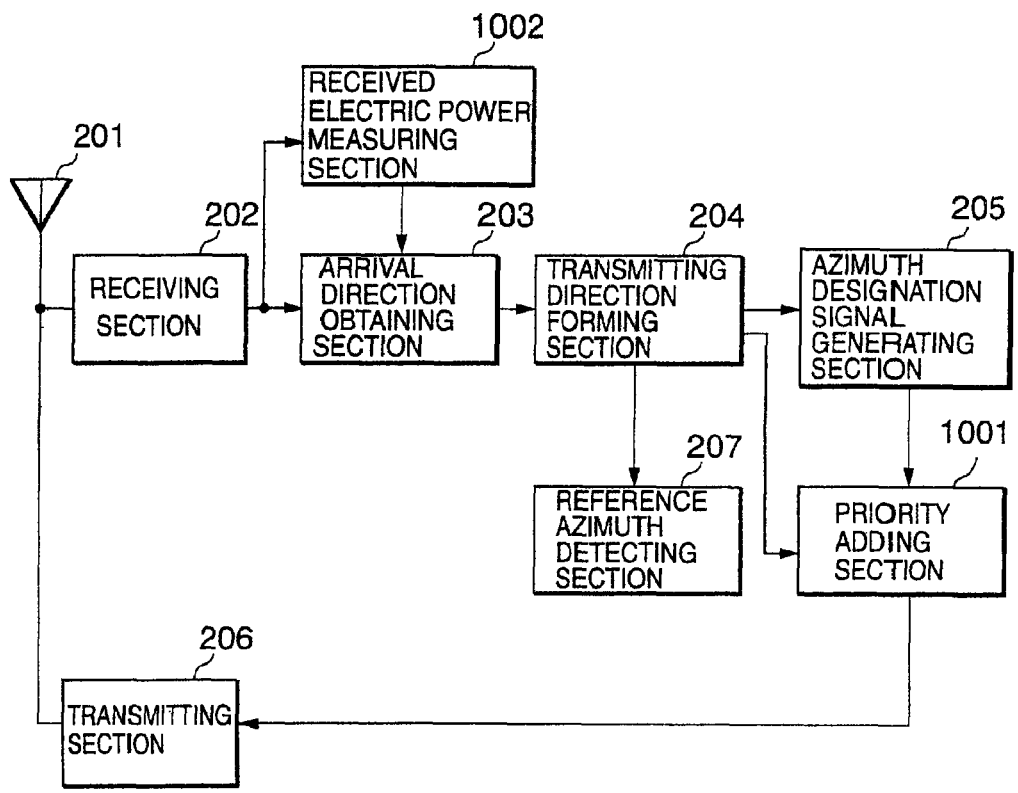
FIG. 10 is a block diagram showing a constitution of a terminal station according to a fifth embodiment of the present invention.

In a radio communication system according to the present embodiment, the constitution of the terminal station according to the first embodiment is partially modified. A constitution of a terminal station according to the present embodiment will now be described with reference to FIG. 10. FIG. 10 is a block diagram showing the constitution of the terminal station according to the fifth embodiment of the present invention. In FIG. 10, the same components as those in FIG. 2 are designated by the same reference numerals as those in FIG. 2 and the description is omitted. In the present embodiment, a case where the terminal station receives m (m denotes natural number that is equal to two or larger) azimuth designation signals will be explained as an example.

In the terminal station shown in FIG. 10, the antenna 201 receives azimuth designation signals transmitted from the reference stations or the other terminal stations, the receiving section 202 frequency-converts the received signals and then outputs the converted signals to the arrival direction obtaining section 203 and a received electric power measuring section 1002. The received electric power measuring section 1002 measures received electric powers of the respective received azimuth designation signals and then outputs the result of measurement to the arrival direction obtaining section 203.

The arrival direction obtaining section 203 obtains the arrival directions of the respective azimuth designation signals and then outputs the result of obtaining to the transmitting direction forming section 204. The arrival direction obtaining section 203 forms a vector in which its magnitude indicates each reception electric power measured by the received electric power measuring section 1002 and its angle indicates each obtained arrival direction, and then combines the formed vectors. The transmitting direction forming section 204 determines an angle represented by the combined vector as the arrival direction of the azimuth designation signal and then obtains azimuth information on the basis of the arrival direction.

The transmitting direction forming section 204 outputs the angle of the formed combined vector as the arrival direction to the azimuth designation signal generating section 205 and also outputs the magnitude of the formed combined vector as electric power information to a priority adding section 1001.

The transmitting direction forming section 204 sets the transmitting directions of the respective azimuth designation signals on the basis of the obtained arrival directions. The azimuth designation signal generating section 205 generates azimuth designation signals having directivities in the respective transmitting directions set by the transmitting direction forming section 204 and then outputs the generated signals to the priority adding section 1001.

The priority adding section 1001 adds a value obtained by a vector operation as priority to each of the azimuth designation signals generated by the azimuth designation signal generating section 205. Specifically, the azimuth designation signal generated by the azimuth designation signal generating section 205 is expressed by an azimuth designation signal vector Vn in which its magnitude indicates the reception electric power according to the electric power information outputted from the transmitting direction forming section 204 and its angle indicates the transmitting direction set by the transmitting direction forming section 204. A coefficient of priority decrease that occurs each time the transmission is repeated once is expressed by reference symbol □ and the number of radio waves is expressed by reference symbol m. Then, a vector operation expressed by Expression 1 is performed. The magnitude of a vector obtained by performing the operation expressed by Expression 1 is determined as a magnitude of the azimuth designation signal and the angle indicated by the vector is determined as the transmitting direction of the azimuth designation signal.

(1)

The priority adding section 1001 generates an azimuth designation signal so as to have directivity in the determined transmitting direction and then outputs the generated azimuth designation signal to the transmitting section 206. The priority adding section 1001 controls the transmitting section 206 so that the magnitude of the azimuth designation signal determined as mentioned above denotes the transmission electric power. The transmitting section 206 transmits the azimuth designation signal with the transmission electric power according to the control of the priority adding section 1001.

The combined vector obtained by performing the operation represented by Expression 1 is decreased at a rate □ each time the azimuth designation signal is transmitted. Therefore, as the number of transmission times is larger, the transmission electric power of the azimuth designation signal is smaller.

Figure 18:
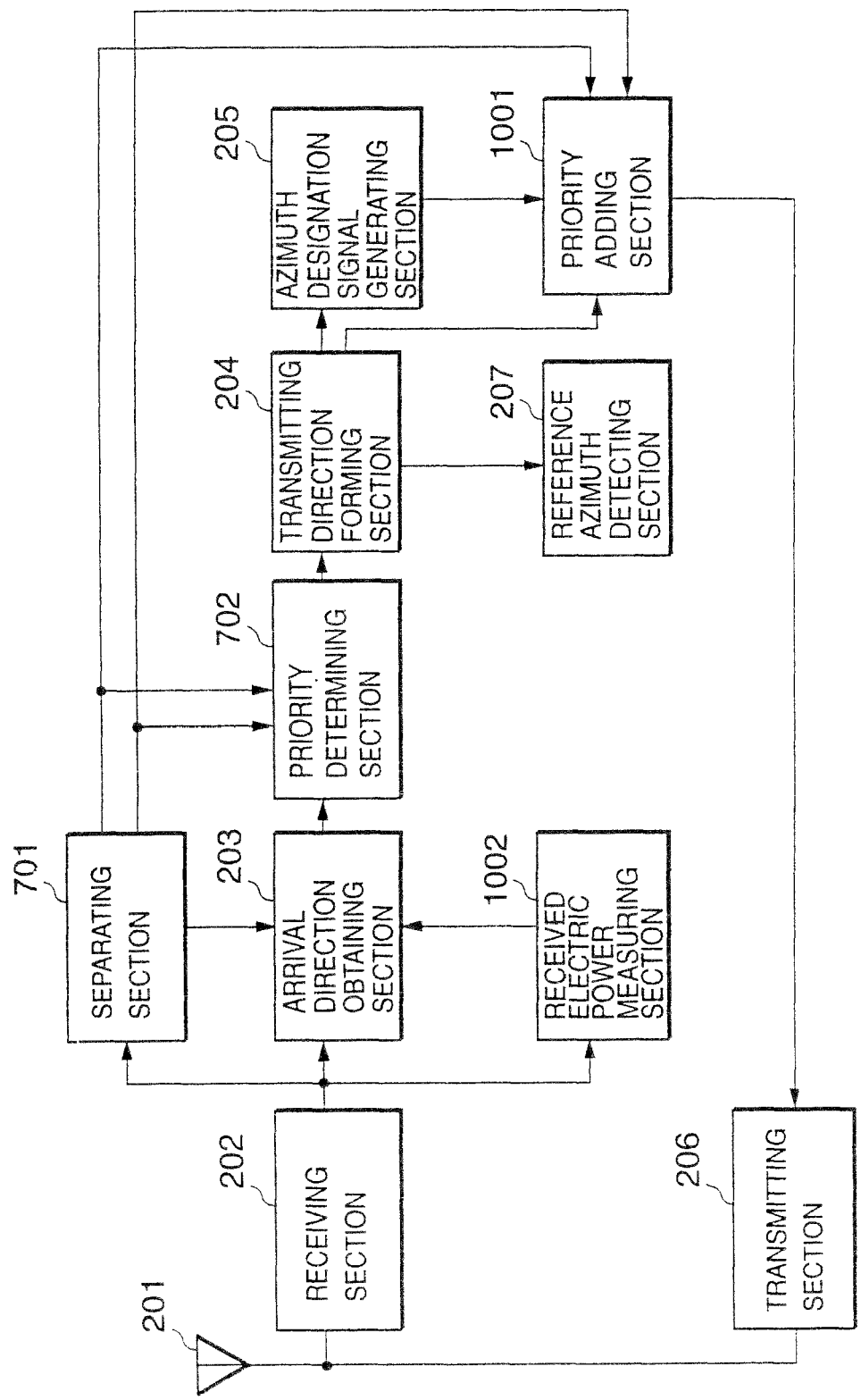
FIG. 18 is a block diagram showing the constitution of the terminal station according to the fifth embodiment of the present invention.

Subsequently, the second example will now be described. As mentioned above, according to the second example, the priority indicated by the priority information described in the third embodiment is decreased each time transmission is performed. As described in the third embodiment, the priority information indicative of the priority A is added to the azimuth designation signal transmitted from the reference station and the priority B is added to the azimuth designation signal transmitted from the terminal station (A>B as mentioned above). FIG. 18 shows a constitution of a terminal station realizing the second example. The terminal station shown in FIG. 18 further has the priority adding section 1001 in addition to the components of the terminal station shown in FIG. 7. In FIG. 18, the same components as those in FIGS. 7 and 10 are designated by the same reference numerals and the detailed description is omitted.

In the terminal station shown in FIG. 18, the priority adding section 1001 decreases the priority indicated by the priority information added to the received azimuth designation signal as much as a predetermined amount and then adds new priority information indicative of the decreased priority to the azimuth designation signal.

For example, when an azimuth designation signal with priority information indicative of the priority B is received, the transmitting direction forming section 204 determines a transmitting direction on the basis of the received azimuth designation signal. Further, the azimuth designation signal generating section 205 generates an azimuth designation signal having directivity in the transmitting direction determined by the transmitting direction forming section 204. The priority adding section 1001 adds priority information indicative of priority B', which is obtained by decreasing the priority B upon reception as much as the predetermined amount, to the azimuth designation signal generated by the azimuth designation signal generating section 205 and then outputs the resultant signal to the transmitting section 206.

Consequently, the priority is decreased by the predetermined amount each time the azimuth designation signal is transmitted. In the terminal station which receives this azimuth designation signal, the priority determining section 702 weights the received signal in accordance with the priority indicated by the priority information. Consequently, the reference azimuth can be specified by effectively using the azimuth designation signal with the small number of transmission times.

As mentioned above, according to the present embodiment, the transmission electric power is reduced each time the azimuth designation signal is transmitted. Accordingly, for the azimuth designation signal to be received by the terminal station, as the number of transmission times is smaller, higher reception electric power is obtained. When the terminal station receives a plurality of azimuth designation signals having different reception electric powers according to the number of transmission times, the arrival direction obtaining section 203 provided for the terminal station weights the received azimuth designation signals in accordance with the respective reception electric powers. Namely, the arrival direction obtaining section 203 forms vectors in each of which the magnitude indicates the reception electric power and the angle indicates the obtained arrival direction with respect to each azimuth designation signal, and combines the formed vectors. Consequently, the arrival direction is determined. Therefore, according to the present embodiment, a deviation in the transmitting direction from the reference azimuth can be reduced, the deviation being caused by repeating the transmission of the azimuth designation signal.

According to the present embodiment, the transmission electric power is controlled in accordance with the number of transmission times of the azimuth designation signal to set the priority according to the number of transmission times. However, a method for setting the priority is not restricted by the control of the transmission electric power. In other words, the priority may be set in accordance with the quality of communication. Because it is considered that as the communication quality is higher, the deviation in the transmitting direction from the reference azimuth is smaller as in the case where as the number of transmission times is smaller, the deviation in the transmitting direction from the reference azimuth is smaller.

Sixth Embodiment

According to the present embodiment, a case where the number of transmission times of an azimuth designation signal is added as priority information will be described. First, for an azimuth designation signal transmitted from a reference station, a terminal station obtains an arrival direction and then sets a transmitting direction on the basis of the obtained arrival direction and, after that, again transmits the resultant signal. The azimuth designation signal transmitted from the terminal station is received by another terminal station. The other terminal station similarly transmits the signal. As mentioned above, the azimuth designation signal is first transmitted from the reference station and, after that, the signal is again transmitted by the terminal station.

According to the present embodiment, the number of transmission times is added as priority information to the azimuth designation signal. That is, the reference station adds priority information indicating such a fact that it is first transmission to the azimuth designation signal and then transmits the resultant signal. The terminal station, which receives the azimuth designation signal to which the priority information indicating the fact that it was the first transmission has been added, sets a transmitting direction, adds priority information indicating such a fact that it is second transmission to the signal, and then transmits the resultant azimuth designation signal. In the same way, the terminal station, which receives an azimuth designation signal to which priority information indicating such a fact that it is Kth transmission has been added, adds priority information indicating such a fact that it is (K+1)th transmission to the azimuth designation signal and then transmits the resultant signal. When a plurality of azimuth designation signals are used, a value obtained by averaging the number of transmission times of the plurality of azimuth designation signals is calculated as the temporary number of transmission times and the calculated temporary number of transmission times is added as priority information.

In this instance, a method for determining an arrival direction in the terminal station according to the present embodiment will now be described. In the present embodiment, conditions other than the method for determining the arrival direction are the same as those of the third embodiment. The present embodiment will now be described with reference to FIG. 7 in a manner similar to the third embodiment.

The antenna 201 receives azimuth designation signals which are transmitted from the reference station and the terminal station and each of which priority information is added to. The receiving section 202 frequency-converts the signals and then outputs the resultant signals to the separating section 701. The separating section 701 separates each received signal into the azimuth designation signal and the priority information, outputs the separated azimuth designation signal to the arrival direction obtaining section 203, and outputs the separated priority information to the priority determining section 702. The arrival direction obtaining section 203 calculates the arrival directions of the plurality of azimuth designation signals, namely, the azimuth designation signal from the reference station and the azimuth designation signal from the terminal station, and then inputs the result of calculation to the priority determining section 702.

The priority determining section 702 weights each of the arrival direction of the azimuth designation signal from the reference station and the arrival direction of the azimuth designation signal from the terminal station outputted from the arrival direction obtaining section 203 in accordance with the priorities with reference to the priority information outputted from the separating section, thereby determining the arrival direction. Specifically, the priority determining section 702 represents the azimuth designation signals transmitted from the reference station and the terminal station as vectors in each of which its magnitude denotes the priority and its angle denotes the obtained arrival direction, and performs vector addition with respect to the azimuth designation signals expressed by the vectors. When it is assumed that the azimuth designation signal expressed by the vector is represented by Vn, the number of received azimuth designation signals Vn is represented by m, and a priority decreasing rate in case of Kn-time transfer is represented by □(Kn), in the priority determining section 702, vector addition expressed by Expression 2 is performed.

(2)

The priority determining section 702 outputs a negative direction of the added vector obtained by the operation expressed by Expression 2 as the arrival direction to the transmitting direction forming section 204. The transmitting direction forming section 204 sets a direction obtained by rotating the arrival direction determined by the priority determining section 702 by 180□ as a transmitting direction. The priority determining section 702 obtains Kn' by averaging the number of transmission times Kn and then adds this Kn' as priority information to the azimuth designation signal.

As mentioned above, according to the present embodiment, the arrival direction is obtained by weighting in accordance with the number of transmission times of the azimuth designation signal, so that a reference azimuth can be specified more accurately.

Seventh Embodiment

According to the present embodiment, a case where a radio communication terminal unit such as a cellular phone, a PHS (Personal Handy-phone System), or a wireless LAN (Local Area Network) is used as a terminal station according to the foregoing respective embodiments will be described. According to the present embodiment, prevention of interference between a channel (hereinbelow, referred to as an "azimuth designation channel") used by azimuth designation signals and another communication channel is realized.

According to the present embodiment, the interference is prevented by the following one or a plurality means.

(1) Frequency division is performed for the azimuth designation channel and the other communication channel. In other words, the azimuth designation signal and another signal transmitted through the other communication channel are superimposed on carrier frequencies having different frequency bands and are then transmitted.

(2) Code division is performed for the azimuth designation channel and the other communication channel. In other words, a spread processing is performed to the azimuth designation signal and another signal transmitted through the other communication channel using different spread codes.

(3) Time division is performed for the azimuth designation channel and the other communication channel. In other words, the azimuth designation signal and another signal transmitted through the other communication channel are transmitted one after the other with respect to time.

(4) The azimuth designation signal is allocated to one of sub carriers in OFDM (Orthogonal Frequency Division Multiplexing).

As mentioned above, according to the present embodiment, the radio communication terminal unit which can obtain azimuth information with a simple constitution can be provided. Particularly, when the means described in (2) to (4) are used, a receiver provided for a conventional radio communication terminal unit can also be used as a receiver for the azimuth designation signal. Consequently, the constitution of the unit can be miniaturized.

Eighth Embodiment

The radio communication system described in any of the foregoing first to seventh embodiments is applied to an ad hoc network. The ad hoc network is a network in which terminal units are connected to each other through a radio channel. In the ad hoc network including a mobile terminal unit, since a position of the mobile terminal unit varies, a bearing of a fixed terminal unit observed from the mobile terminal unit (or a bearing of another mobile terminal unit observed from the present mobile terminal unit) is unclear. It is considered that communication may not be performed appropriately. According to the present embodiment, the mobile terminal unit (namely, the terminal station) explained in any of the above first to seventh embodiments is mounted on a terminal unit in the ad hoc network to enable to specify a communication partner's bearing.

Figure 11:
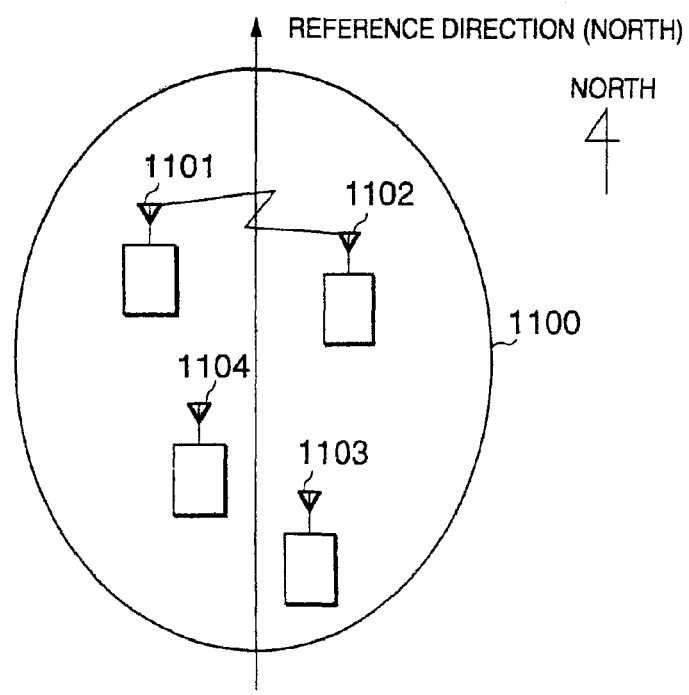
FIG. 11 is a diagram explaining a schematic constitution of an ad hoc network according to an eighth embodiment of the present invention.

FIG. 11 is a diagram explaining a schematic constitution of the ad hoc network according to the eighth embodiment of the present invention. The ad hoc network can realize communication within a range of a service area 1100. The ad hoc network comprises a mobile terminal unit 1101, which can freely moves, and fixed terminal units 1102 to 1104 fixed at setup positions. The mobile terminal unit 1101 and the fixed terminal units 1102 to 1104 are communication units each functioning as the terminal station according to the first embodiment.

Each of communication units (including the mobile terminal unit 1101 and the fixed terminal units 1102 to 1104) included in the ad hoc network transmits an azimuth designation signal toward a predetermined reference azimuth (in this case, "the north").

The mobile terminal unit 1101 obtains an arrival direction of a received azimuth designation signal and obtains azimuth information on the basis of the obtained arrival direction. In other words, the mobile terminal unit 1101 detects a direction obtained by rotating the arrival direction of the azimuth designation signal on a horizontal plane by 180□ as the reference azimuth.

The operation in the case where the mobile terminal unit 1101 communicates with the fixed terminal unit 1102 will now be described. When receiving a signal (hereinbelow, referred to as a "data signal") other then the azimuth designation signal transmitted from the fixed terminal unit 1102, the mobile terminal unit 1101 obtains an arrival direction of the received signal, so that the mobile terminal unit 1101 can detect the bearing of the fixed terminal unit 1102 observed from the unit itself on the basis of a difference between the obtained arrival direction and the detected reference azimuth. In the case shown in FIG. 11, since the unit 1101 receives the signal from the fixed terminal unit 1102 in a direction deviated from the azimuth designation signal by about 90□, the position of the fixed terminal unit 1102 can be specified to the east with respect to the unit itself.

Consequently, the mobile terminal unit 1101 can specify the bearing of the fixed terminal unit 1102 and then perform radio communication therewith. For example, when the fixed terminal unit 1102 is a communication partner, directivity of a signal to be transmitted is formed toward "the east" and the transmission signal is then transmitted. Consequently, interference with units other than the fixed terminal unit 1102 can be reduced. When the fixed terminal unit 1102 is not a communication partner, the directivity of the transmission signal is adaptively controlled to form null in the direction toward the fixed terminal unit 1102. Consequently, interference with the fixed terminal unit 1102 can be avoided.

As mentioned above, according to the present embodiment, since the mobile terminal unit can specify the bearing of the communication partner with a simple constitution, the size of the mobile communication unit used in the ad hoc network can be reduced and the manufacturing cost can be reduced.

Ninth Embodiment

According to the present embodiment, an electric power is transmitted using an azimuth designation signal in the radio communication system according to the first embodiment. The azimuth designation signal is used to obtain an arrival direction. Ordinarily, the signal is not used to transmit data. Accordingly, the signal is suitable for electric power transmission. In the radio communication system according to the present embodiment, the constitution of the terminal station according to the first embodiment is partially modified.

Figure 13:
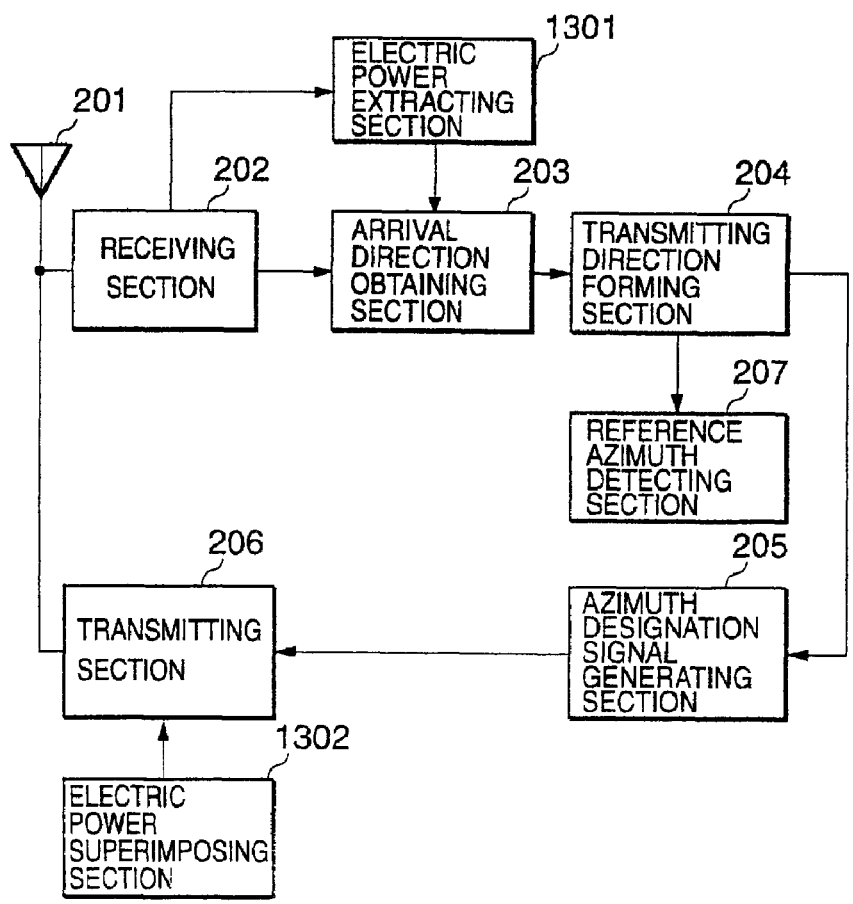
FIG. 13 is a block diagram showing a constitution of a terminal station according to a ninth embodiment of the present invention.

FIG. 13 is a block diagram showing a constitution of a terminal station according to the ninth embodiment of the present invention. In addition to the components of the terminal station shown in FIG. 2, the terminal station shown in FIG. 13 comprises an electric power extracting section 1301 for extracting an electric power from a received signal and an electric power superimposing section 1302 for superimposing the electric power on a signal to be transmitted. In FIG. 13, the same components as those in FIG. 2 are designated by the same reference numerals as those in FIG. 2 and the description is omitted.

In the terminal station shown in FIG. 13, an azimuth designation signal received by the antenna 201 is subjected to frequency-conversion by the receiving section 202 and is then outputted to the electric power extracting section 1301. The power extracting section 1301 extracts an electric field and a magnetic field oscillated by the azimuth designation signal outputted from the receiving section 202 as an electric power.

The power superimposing section 1302 oscillates the electric field and the magnetic field and then superimposes the oscillation on an azimuth designation signal to be outputted from the azimuth designation signal generating section 205.

As mentioned above, according to the present embodiment, the electric power can be transmitted to the terminal station using the azimuth designation signal. Accordingly, continuous available time derived by charging once extends. The system becomes more convenient to the user.

Tenth Embodiment

Figures 14, 15:
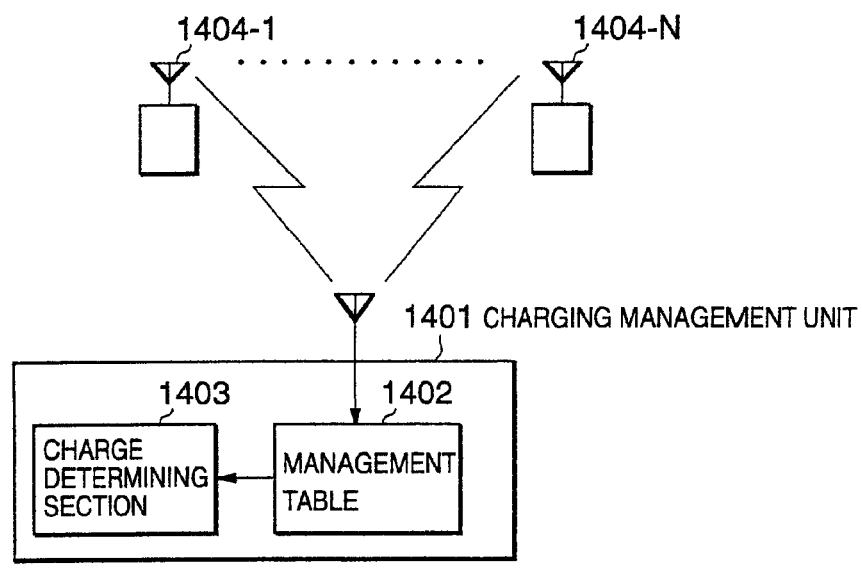
FIG. 14 is a diagram showing a schematic constitution of a charging system according to a tenth embodiment of the present invention.
FIG. 15 is a diagram showing an example of a constitution of a management table.

According to the present embodiment, a charging system for charging a terminal station, included in the radio communication system described in any of the foregoing embodiments, in consideration of the content of a service applied to the terminal station will be described. FIG. 14 is a diagram showing a schematic constitution of the charging system according to the tenth embodiment of the present invention.

A charging management unit 1401 shown in FIG. 14 monitors communicating situations of terminal stations 1404-1 to 1404-N and charges the stations depending on the communicating situations. The charging management unit 1401 has a management table 1402 showing the communicating situations of the respective terminal stations. A charge determining section 1403 determines a charge with reference to the management table 1402.

FIG. 15 shows an example of a constitution of the management table 1402. As shown in FIG. 15, the management table 1402 relates a fact indicating whether an azimuth designation signal has been transmitted with each terminal station. When the terminal station transmits the azimuth designation signal, the charge determining section 1403 releases the terminal station from a charge. When the terminal station does not transmit the signal, the charge determining section 1403 charges the terminal station. In place of the release from the charge, payback or a discount on another communication charge may be given to the terminal station which does not transmit the azimuth designation signal.

According to the above-mentioned charging system, when the terminal stations 1404-1 to 1404-N transmit the azimuth designation signals, they are released from the charge. When the stations do not transmit the signals, an electric power to be consumed can be saved. In other words, the terminal stations 1404-1 to 1404-N can select a profit derived from "the release from the charge" or "the saving of the electric power to be consumed".

When the station transmits the azimuth designation signal, the station is released from the charge. Accordingly, the charging system according to the present embodiment functions as an incentive to transmit the azimuth designation signal for the terminal station. Accordingly, the system can hold many transmission sources of the azimuth designation signals, resulting in a contribution to smooth running of the system.

A method for determining a charge in the charge determining section 1403 is not limited to the example shown in FIG. 15. For example, as shown in FIG. 16, it is possible to charge the terminal stations 1404-1 to 1404-N by monitoring the communicating situations thereof in more detail. In FIG. 16, in case where the station receives an azimuth designation signal to increase azimuth accuracy, the station is charged. In case where the station transmits an azimuth designation signal to provide azimuth information, payback is performed. In addition to the above, in case where the station is supplied with an electric power, the station is charged ("+20"). On the contrary, when the station provides the electric power, payback is performed ("−10").

According to each of the foregoing embodiments, there is provided the radio communication system in which each station transmits the azimuth designation signal toward the reference azimuth, so that the reference azimuth can be detected independently and distributedly. Even when the system is not an independently distributed system, the present invention can be applied thereto. That is, even when each terminal station does not transmit the azimuth designation signal, the reference azimuth is detected on the basis of the azimuth designation signal transmitted from the reference station, so that an absolute azimuth can be detected.

In the foregoing embodiments, the reference stations and the terminal stations radiate the azimuth designation signal in one predetermined direction such as the north, and other stations and the terminal stations receive the signal and subsequently radiate the azimuth designation signal. It is considered that when errors regarding the direction are accumulated, the azimuth may not be grasped correctly. As one of preferred embodiments, the radiating direction of the azimuth designation signal is not only the predetermined direction and a second azimuth designation signal to be radiated in a direction different from the above direction is used. In other words, when a first azimuth designation signal is radiated northward, a second azimuth designation signal is radiated eastward that is deviated from the north by 90□, each terminal station receives the two kinds of azimuth designation signals, and a processing similar to that of each of the foregoing embodiments is performed. Consequently, the accumulated errors regarding the azimuth is corrected, so that a correct azimuth can be obtained.

The present invention is not limited to the above embodiments. The foregoing embodiments can be appropriately combined and used. For instance, the charging system described in the tenth embodiment can be applied to the radio communication system according to the second embodiment.

INDUSTRIAL APPLICABILITY

As mentioned above, according to the present invention, the terminal station transmits an azimuth designation signal in the direction opposite to an arrival direction of a received azimuth designation signal from another station, so that the terminal station can obtain azimuth information with a simple constitution.

What is claimed is:

1. A radio communication system comprising:
a plurality of transmitting stations and at least one transmitting/receiving station both arranged in a given area, wherein each of said plurality of transmitting stations comprises a transmitting section for transmitting an azimuth designation signal having directivity in a direction determined in accordance with a position within said area, and said transmitting/receiving station comprises a receiving section that receives said azimuth designation signal(s) when said azimuth designation signal(s) transmitted from one or more of said plurality of transmitting stations is/are receivable and/or when said azimuth designation signal(s) transmitted from said transmitting/receiving station(s) other than said transmitting/receiving station, in which said receiving section is included, is/are receivable;
an arrival direction obtaining section that obtains an arrival direction of said azimuth designation signal(s) received by said receiving section;
a received power measuring unit that respectively measures received power of said plurality of azimuth designation signals received;
a vector generating section that generates a vector having magnitude of said received power and direction of said arrival direction on the basis of said received power and said arrival direction;
a combined vector generating section that generates a combined vector by combining said vectors respectively generated for said received azimuth designation signals;
an azimuth designation signal generating section that generates a new azimuth designation signal on the basis of the magnitude and the direction of said combined vector, by determining the direction of said combined vector as an arrival direction of an azimuth designation signal and by obtaining directional information on the basis of this arrival direction; and
a transmitting section that transmits said new azimuth designation signal generated by said azimuth designation signal generating section with directivity in a direction of said combined vector or in a direction having a predetermined angle with said combined vector.

2. A radio communication system according to claim 1, wherein:
said transmitting station and said transmitting/receiving stations respectively add priority information to said azimuth designation signals and then respectively transmit resultant signals, and
said azimuth designation signal generating section weights said plurality of received azimuth designation signals in accordance with said priority information to determine a transmitting direction of said new azimuth designation signal.

3. A radio communication system according to claim 1, further comprising a priority adding section that adds priority to said azimuth designation signal, said priority being arranged to decrease as the number of consecutive transmissions through said transmitting/receiving station(s) increases.

4. A stationary transmitting station arranged in a service area in which a radio communication system is configured to provide a radio communication service, comprising:
a generation section that generates an azimuth designation signal; and a transmission section that transmits said azimuth designation signal, wherein:
said azimuth designation signal indicates directivity in a direction determined when said stationary transmitting station is arranged in said service area in such a manner that said direction represents a longitudinal direction of said service area.

5. The stationary transmitting station according to claim 4, wherein the direction of said directivity is set along a road along which said service area is provided.

6. A terminal station arranged in a service area in which a plurality of stationary transmitting stations are arranged and in which a radio communication system is configured to provide a radio communication service, the terminal station comprising:
   a reception section that receives a first azimuth designation signal from one of the plurality of the stationary transmitting stations; and
   a transmission section that transmits a second azimuth designation signal in a direction opposite to an arrival direction of said first azimuth designation signal, wherein:
   said first azimuth designation signal indicates directivity in a basis direction determined when each stationary transmitting station is arranged in said service area in such a manner that said basis direction represents a longitudinal direction of said service area.

7. A transmission method performed by a stationary transmitting station arranged in a service area in which a radio communication system is configured to provide a radio communication service, comprising:
   generating an azimuth designation signal; and
   transmitting said azimuth designation signal, wherein:
   said azimuth designation signal indicates directivity in a direction determined when said stationary transmitting station is arranged in said service area in such a manner that the direction represents a longitudinal direction of said service area.

8. A transmission method performed by a terminal station arranged in a service area in which a radio communication system is configured to provide a radio communication service, comprising:
   receiving a first azimuth designation signal from a stationary transmitting station; and
   transmitting a second azimuth designation signal in a direction opposite to an arrival direction of said first azimuth designation signal, wherein:
   said first azimuth designation signal indicates directivity in a basis direction determined when said stationary transmitting station is arranged in said service area in such a manner that said basis direction represents a longitudinal direction of said service area.

* * * * *